June 25, 1957 O. J. BORROWDALE 2,796,971

MULTIPLE STAGE ELEVATOR-CONVEYOR EMPLOYING LATERALLY MOVABLE PROJECTING MEMBERS

Filed May 11, 1953 10 Sheets-Sheet 1

INVENTOR.
Orville J. Borrowdale
BY
Gary Desmond & Parker
Att'ys.

June 25, 1957 O. J. BORROWDALE 2,796,971

MULTIPLE STAGE ELEVATOR-CONVEYOR EMPLOYING LATERALLY MOVABLE PROJECTING MEMBERS

Filed May 11, 1953 10 Sheets-Sheet 2

INVENTOR.
Orville J. Borrowdale
BY
Gary Desmond & Parker
Att'ys.

INVENTOR.
Orville J. Borrowdale
BY
Gary Desmond & Parker
Att'ys.

INVENTOR.
Orville J. Borrowdale
BY
Gary Desmond & Parker
Att'ys

INVENTOR.
Orville J. Borrowdale
BY
Gary Desmond & Parker
Att'ys.

June 25, 1957 O. J. BORROWDALE 2,796,971

MULTIPLE STAGE ELEVATOR-CONVEYOR EMPLOYING LATERALLY MOVABLE PROJECTING MEMBERS

Filed May 11, 1953 10 Sheets-Sheet 6

INVENTOR.
Orville J. Borrowdale
BY
Gary, Desmond & Parker
attys.

June 25, 1957 O. J. BORROWDALE 2,796,971

MULTIPLE STAGE ELEVATOR-CONVEYOR EMPLOYING LATERALLY MOVABLE PROJECTING MEMBERS

Filed May 11, 1953 10 Sheets-Sheet 7

INVENTOR.
Orville J. Borrowdale
BY
Gary Desmond & Parker
Att'ys.

INVENTOR.
Orville J. Borrowdale
BY
Gary Desmond & Parker
Att'ys

June 25, 1957

O. J. BORROWDALE 2,796,971

MULTIPLE STAGE ELEVATOR-CONVEYOR EMPLOYING LATERALLY MOVABLE PROJECTING MEMBERS

Filed May 11, 1953

10 Sheets-Sheet 9

INVENTOR.
Orville J. Borrowdale
BY
Gary Desmond & Parker
Att'ys.

INVENTOR.
Orville J. Borrowdale
BY
Gary Desmond & Parker
Att'ys 2,796,971
Patented June 25, 1957

2,796,971

MULTIPLE STAGE ELEVATOR-CONVEYOR EMPLOYING LATERALLY MOVABLE PROJECTING MEMBERS

Orville J. Borrowdale, Chicago, Ill.

Application May 11, 1953, Serial No. 353,939
18 Claims. (Cl. 198—102)

This invention relates to improvement in an elevator-conveyor, that is, a device for lifting or elevating materials from a lower level to an upper level, and refers particularly to a device which may elevate the material in a plurality of stages with means contemplated in each stage whereby retrogressive movement of the material being elevated in the stage is inhibited.

One of the important features of the present invention resides in the provision of a device which can be employed as a vertical link in a conveying system, the device having a capacity such that it can operate in step with the usual horizontal conveyors, yet the effective height through which it may elevate materials is great relative to the total length of travel of the material thereon.

One of the important specific advantages of the invention resides in the provision of a device for elevating material in stages or flights wherein projecting means or blades are laterally movable into the mass of material being elevated to inhibit rearward or retrogressive movement of the material.

Another important feature of the invention resides in a multiple stage elevator wherein the material in being passed from stage to stage is carried by the same supporting means which elevates it in each of the stages, that is, there is no necessity for transferring the material from one supporting means to another supporting means when the material passes from stage to stage.

A further important feature of the invention resides in the use of a pair of endless, flexible belts which move with the material supported thereby from stage to stage.

Another important feature of the invention resides in the provision of means which permits a pair of endless, flexible belts of maximum width to be used in supporting and carrying the material from stage to stage of a multiple stage elevating device.

Other objects, advantages and features of the present invention will be apparent from the accompanying drawings and following detailed description.

In the drawings, Fig. 1 is a front elevational of a multiple stage elevating device embodying concepts of the present invention.

Figure 1:
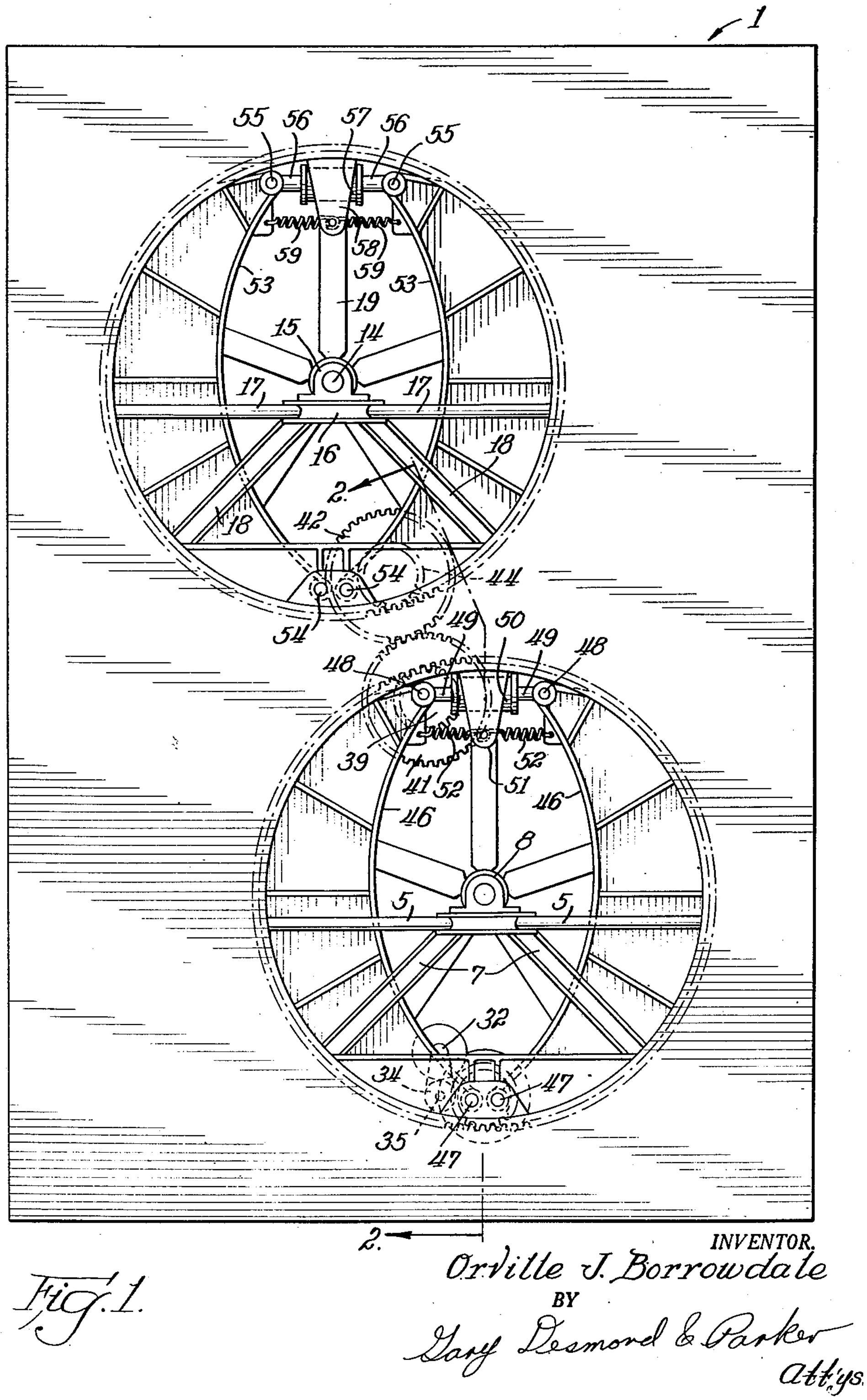
Figure 2:
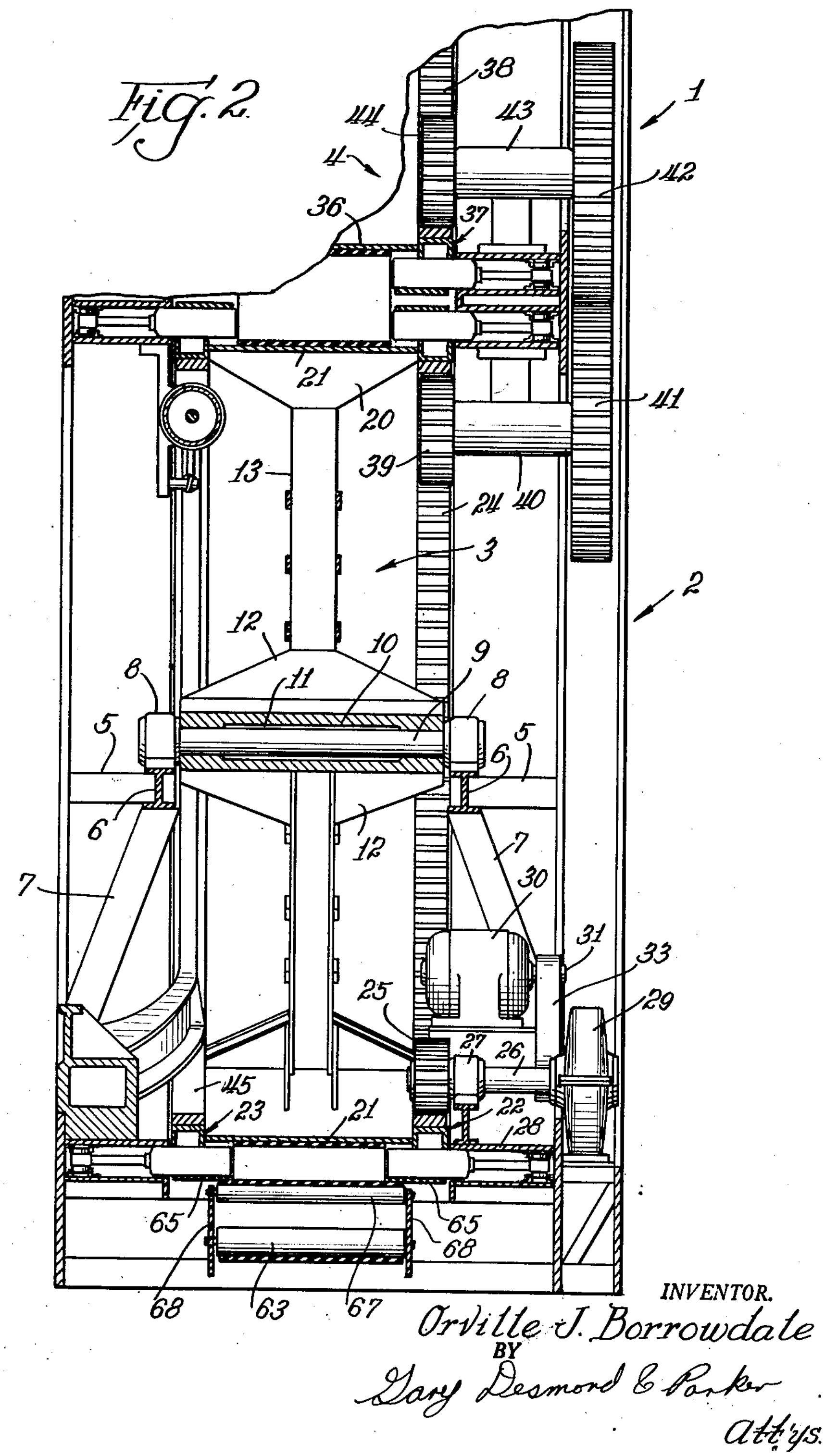
Fig. 2 is an enlarged sectional view taken on line 2—2 of Fig. 1.

Referring in detail to the drawings, and with specific reference to Figs. 1 and 2 thereof, 1 indicates generally a multiple stage elevator conveyor. The device 1 comprises essentially a relatively stationary frame 2 which carries two relatively rotatable frames 3 and 4, the frame 3 being rotatably mounted upon the stationary frame 2 adjacent the lower portion of said frame and the rotatable frame 4 being similarly mounted upon the upper portion of the stationary frame 2.

The stationary frame comprises a plurality of structural members so arranged as to support the rotatable frames 3 and 4. The means for supporting the lower rotatable frame 3 comprises horizontal beams 5 which are anchored at one end upon the stationary frame proper and at the other end support spaced horizontally disposed I beams 6. Diagonally disposed beams 7 also support the I beam 6 adjacent each side of the stationary frame.

A bearing 8 is positioned on each of the spaced I beams 6 and a shaft 9 is rotatably positioned in the spaced bearings 8. A hub 10 is keyed to shaft 9 by means of keys 11 whereby said hub is rotatable with the shaft 9. A plurality of spreader plates 12 are circumferentially spaced from each other and are rigidly carried by the hub 10. A plurality of structural members 13 also radiate from the hub 10 and from spokes for the rotating frame 3. Each of the structural members 13 is reinforced by means of a spreader plate 12.

The upper rotatable frame 4 is carried by a transverse shaft 14 which, in turn, is journaled in spaced bearings 15, similar to the bearings 8. Each of the bearings 15 is supported by a horizontally disposed I beam 16 which in turn is carried by a plurality of horizontal beams 17 and diagonally disposed beams 18, the beams 17 and 18 being, in turn, supported by the stationary frame 2. The rotatable frame 4, similar to frame 3, comprises a plurality of radiating spoke members 19 which are similar to the structural members 13 comprising the spokes for the lower rotatable frame.

At the outer ends of each of the spoke members 13 a spreader plate 20 is carried and a substantially cylindrical drum plate 21 is supported by the circumferentially spaced spreader plates 20. Adjacent one side edge of the drum plate 21 an annular structural member 22 is positioned and at the opposite side of the rotatable frame a substantially similar annular structural member 23 is disposed. A ring gear 24 is carried upon the inner face of the structural member 22, said ring gear being adapted to mesh with a driving gear 25. The driving gear 25 is carried at the end of shaft 26 which is journaled in bearing 27 carried upon a portion 28 of the stationary frame. The shaft 26 comprises the output shaft of a conventional gear reducer 29 which is also mounted upon a portion of the stationary frame 2. An electric motor 30 is mounted upon the stationary frame and shaft 31 of the motor carries a pulley 32 which is adapted to drive belt 33, the latter being trained around a pulley 34 mounted upon the input shaft 35 of the gear reducer 29. The arrangement is such that when motor 30 is energized the rotatable frame 3 is rotated about bearings 8 by means of the engagement of gear 25 with ring gear 24.

The rotatable frame 4 is constructed substantially identical with the rotatable frame 3 and a drum plate 36 is carried upon the outer ends of the spokes 19, the drum plate 36 being substantially cylindrical. An annular structural member 37 is carried at one side of the drum plate 36 and upon the inner face of the structural member 37 a ring gear 38 is mounted.

A spur gear 39 meshes with ring gear 24 of the lower rotatable frame 3, said spur gear being mounted upon a shaft (not shown) which is journaled in bearing 40, said bearing being carried by the stationary frame 2. At the opposite end of said shaft an idler gear 41 is mounted, said gear being in mesh with a similar idler gear 42. The idler gear 42 is carried upon a shaft (not shown) which is journaled in bearing 43 which, in turn, is mounted upon the stationary frame 2. At the opposite end of the shaft which carries the idler gear 42 a spur gear 44 is mounted, said spur gear being in mesh with the ring gear 38 carried upon the upper rotatable frame 4. Thus, when the lower rotatable frame 3 is rotated by means of motor 30, the upper rotatable frame 4 rotates in timed relationship therewith by means of the gearing arrangement comprising gears 39, 41, 42 and 44.

At the opposite side edge of the cylindrical drum plate 21 a brake drum 45 is positioned. A pair of similar brake shoes 46 having arcuate braking surfaces are adapted to cooperate with the brake drum 45 whereby the rotation of the rotatable frame 3 may be retarded or stopped when desired. Each of the brake shoes 46 at their lower ends is pivoted, as at 47 in Fig. 1, to a portion of the stationary frame 2. At the opposite ends of each of the brake shoes 46, said brake shoes are pivoted, as at 48, in Fig. 1, to oppositely extending piston rods 49, each of the piston rods is connected to a piston which operates in hydraulic cylinder 50, the arrangement being such that when fluid under pressure is introduced into the cylinder 50, the upper end portions of the brake shoes 46 are moved outwardly into braking contact with brake drum 45.

A bracket 51 is carried by the stationary frame 2 and functions as an anchorage for coil springs 52, the opposite ends of which are secured to the opposite brake shoes 46. The arrangement is such that when pressure is relieved from the cylinder 50 the upper ends of the brake shoes 46 are moved inwardly and thus permit free rotation of the rotatable frame 3.

The upper rotatable frame 4 also carries a brake drum, not shown, similar to the brake drum 45 with which similar opposite brake shoes 53 cooperate. The brake shoes 53, at their lower ends, are pivoted, as at 54 in Fig. 1 to a portion of the stationary frame 2. The upper ends of the brake shoes 53 are pivoted, as at 55, in Fig. 1, to opposite extending piston rods 56 which operate in a hydraulic cylinder. The brake shoes 53 are manipulated by the introduction of fluid under pressure into the cylinder 57 in the same fashion as has been hereinbefore described in conjunction with brake shoes 46. Similarly a bracket 58 is carried by the stationary frame which functions as an anchorage for coil springs 59, the opposite ends of which are anchored to the brake shoes 39 whereby release of pressure from the cylinder 57 permits the retraction or inward movement of the brake shoes 53 away from the cooperating brake drum of stationary frame 4.

Figure 3:
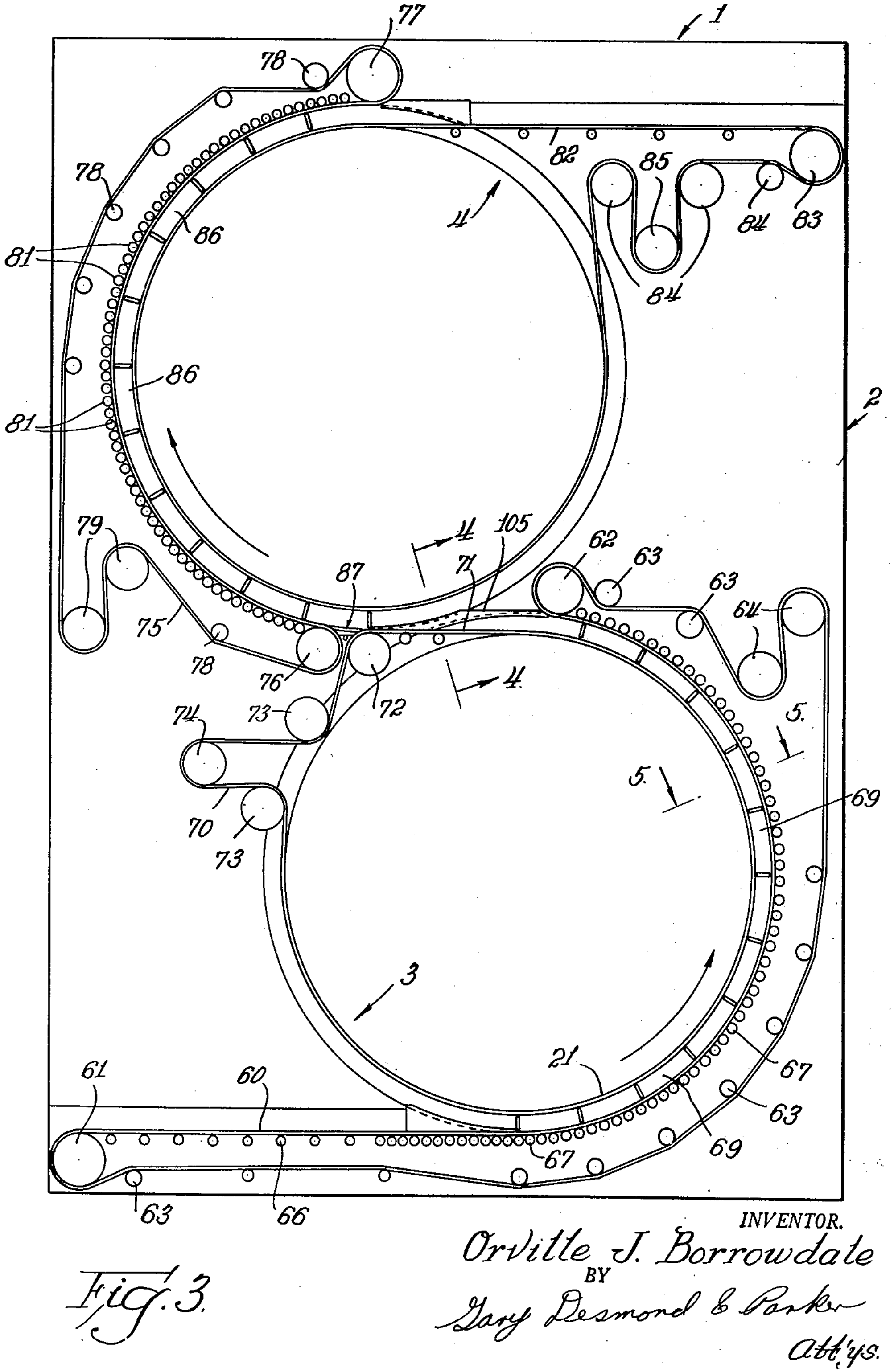
Fig. 3 is a diagrammatic view illustrating the use of separate belts for each stage of the multiple stage conveyor illustrated in Figs. 1 and 2.

Referring particularly to Fig. 3, the stationary frame 2 and rotatable frames 3 and 4 are shown diagrammatically to illustrate particularly the cooperative relationship of the rotatable frames with the flexible endless belts which are associated with said frames.

Endless flexible belt 60 which may comprise a conventional rubber conveyor belt, flexible steel belt or link belt, may be trained around terminal rolls 61 and 62. The portion of the upper pass of the belt 60 from the terminal roll 61 to the lowermost portion of the rotatable frame 3 comprises the feed portion of said belt and said upper pass is adapted to carry materials which are to be elevated. As illustrated, the upper pass of the belt 60 moves substantially tangentially relative to the rotatable frame 3 and follows the arcuate path defined by the periphery of the frame 3 for substantially its entire upwardly moving side. The belt 60 then returns over the terminal roll 62 and is guided by appropriately disposed guide rolls 63 and eventually wraps around the terminal roll 61. Belt tightening rolls 64 may be employed at the return pass of the belt 60 whereby the belt may be maintained in desired taut condition.

As has been hereinbefore described the rotatable frame 3 is flanked on each side by annular structural members 22 and 23.

Figures 4, 5:
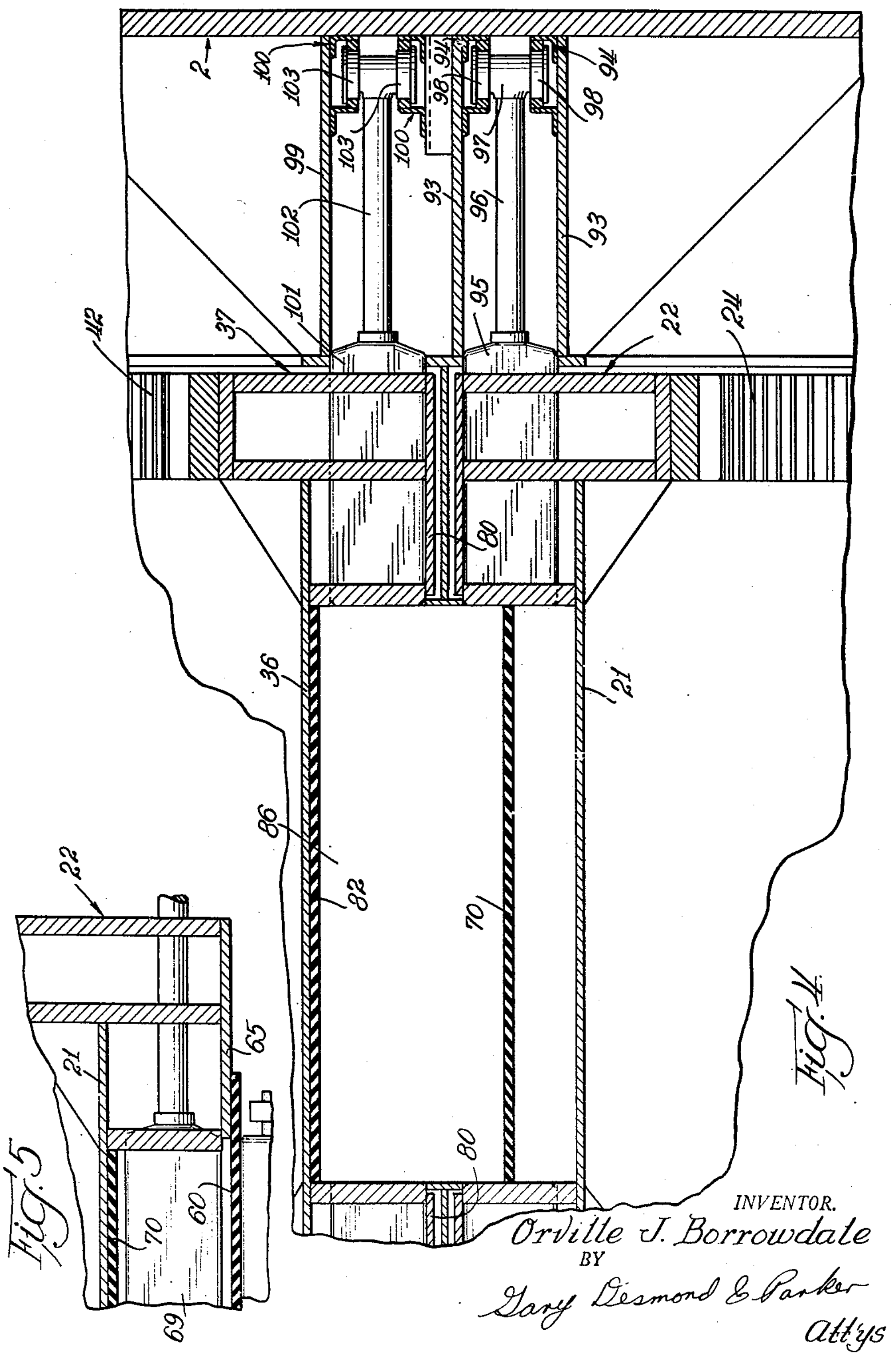
Fig. 4 is an enlarged detailed sectional view taken on line 4—4 of Fig. 3.
Fig. 5 is an enlarged detailed sectional view taken on line 5—5 of Fig. 3.

Each of said structural members has an inwardly extending portion 65 (Figs. 2 and 5) with which the edge portions of the belt 60 may contact. In this fashion the belt 60 wraps around the upwardly moving side of the rotatable frame 3. The upper pass of the belt 60 is supported by a plurality of supporting rolls 66 and during the path of travel of the belt 60 upon the rotatable frame 3 said belt also makes contact with a plurality of relatively closely spaced rollers 67, the axes of which describe an arcuate path which is radially spaced outwardly from the rotatable frame 3. The rollers 67 are supported by opposite arcuate frame members 68 which in turn are secured to the stationary frame 2. The guide rolls 63 are also journaled on the stationary frame as are terminal rolls 61 and 62 and the supporting rolls 66. Thus, as the upper pass of the belt 60 passes into tangential relationship with the rotatable frame 3 said belt is confined between the rollers 67 and the annular inward extensions 65 carried by the annular frame members 22 and 23. As will be hereinafter more fully described, the arcuate portion of the belt 60 as it passes along the upwardly traveling side of the rotatable frame 3 defines, with drum plate 21, an arcuate space 69 in which the material carried on the upper pass of the belt 60 moves, that is, said material is carried arcuately between the belt 60 and the rotatable frame 3.

As will be hereinafter more fully described, the material carried through the space 69 is subsequently transferred to a similar arcuate space associated with the rotatable frame 4. To facilitate the transfer of the material from the space 69 to the corresponding space associated with the rotatable frame 4, a second belt 70 is employed, said belt being relatively narrower than the belt 60 and wraps around the rotatable frame, in contact with the drum plate 21. Accordingly, the space 69 is defined by the two belts 60 and 70, but inasmuch as the belt 70 rides in plane parallel contacting relationship with the drum plate 21, said drum plate may also be considered as a defining portion of the space 69. Adjacent the upper portion of the rotatable frame 3 the belt 70 moves substantially tangentially with respect to the drum plate as indicated at 71 in Fig. 3. This tangential movement of the belt occurs adjacent the terminal roll 62. The tangentially extending portion 71 of the belt 70 terminates at guide roll 72 and thereafter said belt passes around guide rolls 73 and the belt tightening roll 74.

A flexible endless belt 75 is associated with the rotatable frame 4 in a manner similar to the association of the belt 60 with the rotatable frame 3. The belt 75 is trained around terminal rolls 76 and 77 and during a portion of the pass of the belt 75 between said terminal rolls said belt moves in an arcuate path spaced radially outwardly from the periphery of the rotatable frame 4, the arcuate path spanning substantially the upwardly moving side of the rotatable frame 4. The belt 75 on its return pass from terminal roll 77 to terminal roll 76 is guided by guide rolls 78 and also passes around the belt tightening rolls 79.

As has been hereinbefore described the rotatable frame 4 is flanked on each side by an annular structural member 37. Each structural member 37 has an inwardly extending portion 80 corresponding to the inwardly extending portions 65 described in conjunction with the annular frame members 22 and 23. It is upon the opposite inwardly extending members 80 that the belt 75 rides during its arcuate passage from terminal roll 76 to the terminal roll 77. In addition, a plurality of closely spaced rollers 81 are carried by the stationary frame, said rollers being related in the same fashion to the rotatable frame 4 as are rollers 67 to the frame 3. Hence, when the belt 75 passes from terminal roll 76 to terminal roll 77, being carried by the inwardly extending projections 80, the belt also makes contact with the rollers 81 which define an arcuate path adjacent the upwardly moving side of the rotatable frame 4.

A belt 82 is also associated with the rotatable frame 4, said belt wrapping around a major portion of the rotatable frame and being in contact with the drum plate 36. At the upper portion of the rotatable frame 4 the belt 82 extends tangentially and is carried around a terminal roll 83, thence around guide rolls 84 and belt tightening roll 85. The tangential portion of travel of the belt 82 comprises the discharge portion of the device, that is, material carried by the upper rotatable frame 4 is carried from said frame upon the tangentially extending portion of the belt 82. The belts 75 and 82 are related to each other in a manner similar to that relationship described relative to the belts 60 and 70. It can readily be seen that adjacent the upwardly moving side of the rotatable frame 4 the belts 75 and 82 are radially spaced from each other and define an arcuate space 86. It is in this space that the material transferred from the lower rotatable frame is carried. It will be noted that the roll 72 over which the tangential portion 71 of belt 70 extends, is positioned adjacent the terminal roll 76. Between the rolls 72 and 76 a transfer plate 87 is positioned which is shown in detail in Figs. 6 and 7. The arrangement is such that the material carried through space 69 moves over the tangential portion 71 of the belt 70 and is transferred to the upper surface of the transfer plate 87 and is thence moved to the arcuate pass of the belt 75. Thereafter the material moves upwardly between belts 75 and 82 and eventually is carried tangentially upon the tangential extending portion 82, that is, the discharge portion of the device.

Figure 6:
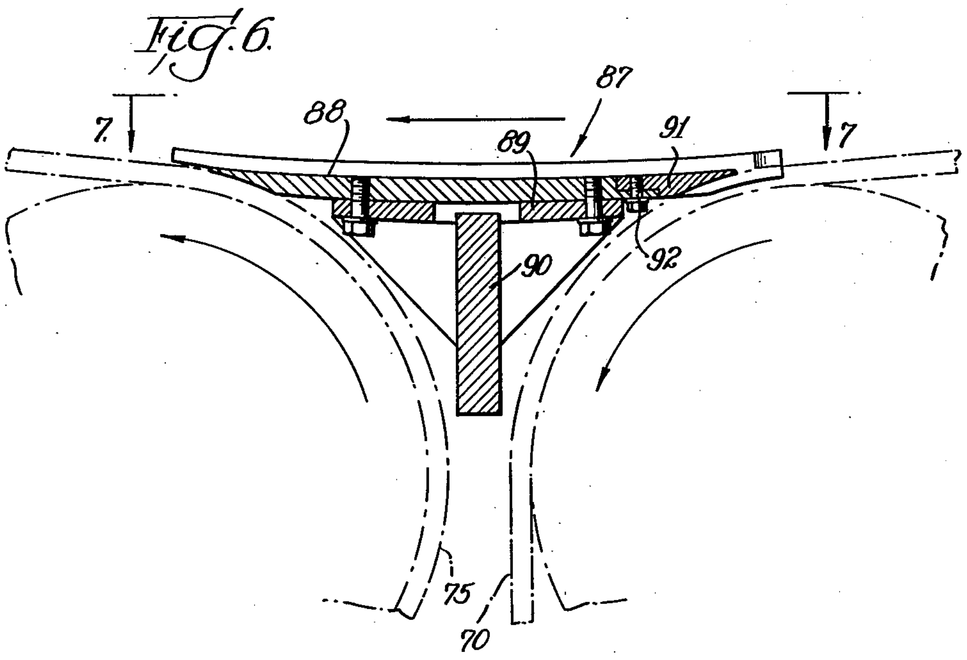
Fig. 6 is a detailed sectional view of the transfer plate employed where separate belts are employed with each stage, the section being taken on line 6—6 of Fig. 7.
Figure 7:
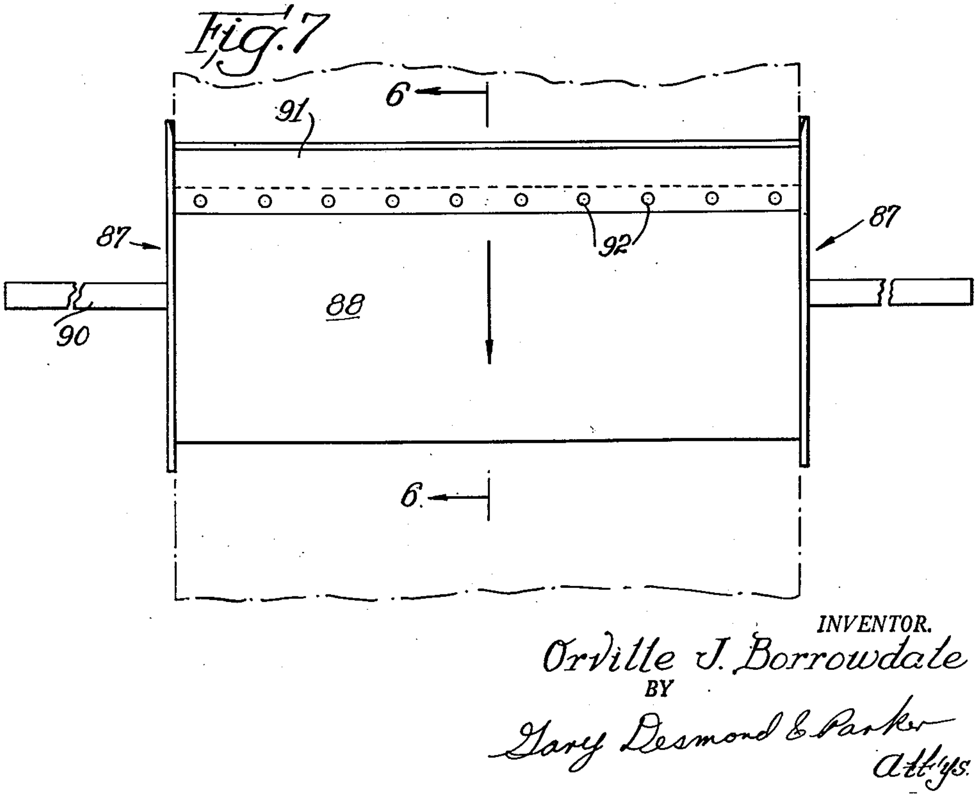
Fig. 7 is a top plan view of the device shown in Fig. 6 as seen looking in the direction of the arrows 7—7 in Fig. 6.

Referring particularly to Figs. 6 and 7, the transfer plate 87 comprises a relatively flat plate 88 which is of a width substantially equal to the width of the belts 70 and 75. The plate 88 is supported by a sub-plate 89 which in turn is carried by a transversely extending beam 90 which is mounted upon the stationary frame 2. The forward edge of the transfer plate 87, that is, that portion which is adjacent the belt 70, comprises a removable extension 91 secured to the plate 88 by means of bolts 92 or the like. By virtue of the fact that the extension 91 initially engages the material carried upon the belt 70, it is subjected to the greatest amount of wear and consequently it is constructed so that it may be removed when excessive wear occurs and a new extension positioned in its place.

As can readily be seen, when material carried upon the upper pass of the belt 60 moves into the space 69 and when material transferred from belt 70 to belt 75 moves into the space 86, the material in each case is moved upwardly at an increasingly abrupt angle and hence there may be a tendency more or less, depending upon the material being elevated, for said material to slip rearwardly or to retrogress. In order to prevent or inhibit this retrogressive movement a plurality of projections are employed which extend into the respective arcuate spaces 69 and 86 during the upward movement of the material around the rotatable frames 3 and 4. The projections for accomplishing this purpose and the means for actuating said projections will be hereinafter more fully described.

A pair of spaced annular walls 93 are mounted upon the stationary frame 2 on each side of the rotatable frame 3. A cam track 94 is mounted upon the inner face of each wall 93, said cam tracks being endless and traversing the path of travel of the peripheral position of the rotatable frame, but being mounted upon the stationary frame, the tracks are stationary relative to the rotatable frame. The cam tracks are arranged in pairs on each side of the machine, there being an outer cam track and an inner cam track constituting each pair.

A plurality of circumferentially spaced slots are provided in each annular frame member 22 and 23 through each of which a projection or blade 95 extends. The rear end of each blade is connected to a rod 96 which at its end carries a bearing 97, said bearing carrying a shaft (not shown) which, in turn, carries a pair of rollers 98. The rollers 98 are movably engageable with the inner and outer cam tracks 94 of each pair of cam tracks on each side of the machine. The arrangement is such that when rotatable frame 3 rotates the projections or blades 95 are carried therewith and the rollers 98 move in the tracks 94. As will be hereinafter more fully described, the tracks 94 are spaced differentially throughout their circular length toward and away from the annular frames 22 and 23 and, hence, the follower rollers 98 moving in said tracks, move the rods 96 and blades laterally during rotation of the frame 3. This lateral movement results in the blades being moved into and out of the arcuate space 69 during rotation of frame 3.

A pair of annular walls 99 is also mounted upon each side of the stationary frame 2, said walls carrying spaced cam tracks 100, similar to cam tracks 94. The cam tracks 100, however, traverse generally the path of travel of the peripheral portion of rotatable frame 4. The opposite annular frame members 37 are provided with circumferentially spaced slots through which projections or blades 101 extend, each of said projections or blades being carried by a rod 102 which, in turn, carries rollers 103 which ride in the cam tracks 100. The purpose of cam tracks 100 and their association with blades 101 is to move said blades into and out of the arcuate space 86 provided adjacent the periphery of frame 4.

Figure 9:
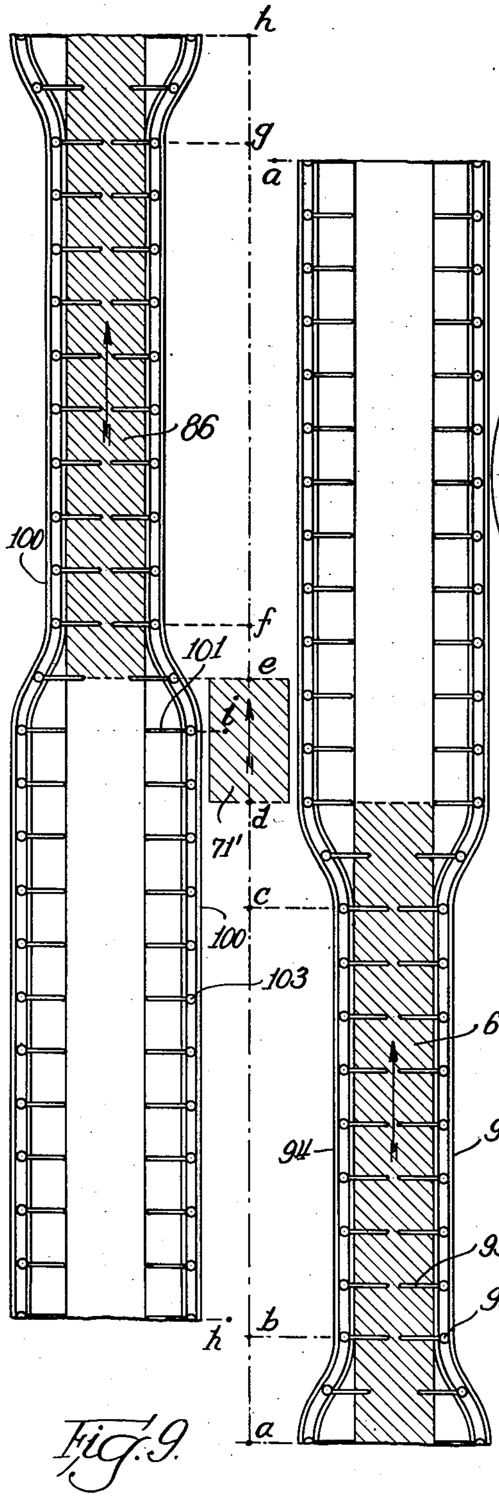
Fig. 9 is a diagrammatic development view of the cam tracks for effecting the movement of the movable projections as indicated angularly in Fig. 8.
Figure 8:
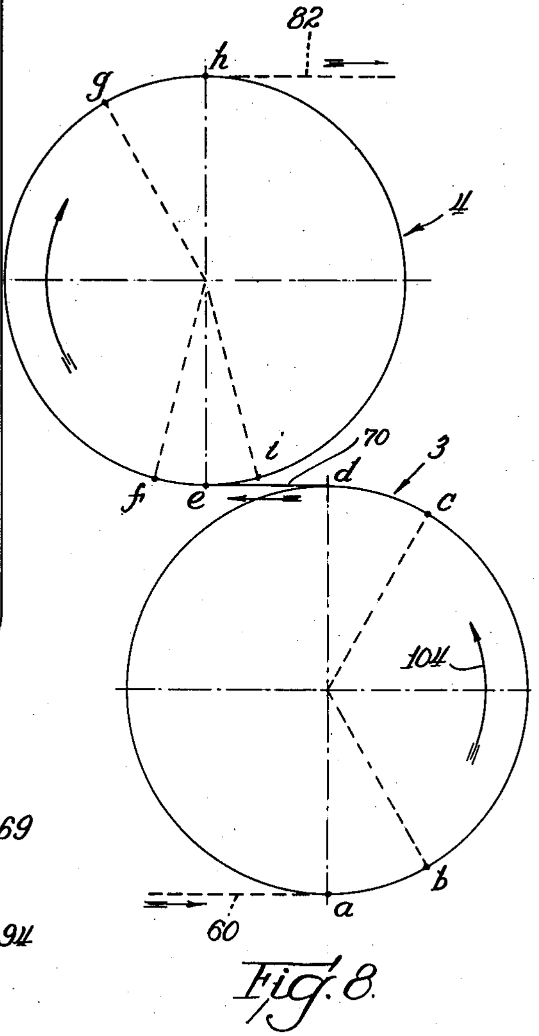
Fig. 8 is a diagrammatic view of the two stages of the elevator indicating the angular timing of the movement of the movable projections which inhibit retrogressive movement of the material being elevated.

In Figs. 8 and 9 the relationships of the cam tracks 94 and 100 to the rotatable frames 3 and 4 are diagrammatically illustrated. In Fig. 9 the position of the cam tracks 94 are correlated to the space 69. At the point marked *a*, it will be noted that the cam tracks 94 are separated a maximum degree, that is, the blades 95 are retracted from the space 69. The corresponding point *a* in Fig. 8 indicates that this relationship occurs where the feed belt 60 moves into tangential relationship to frame 3. As the frame 3 moves from *a* to *b*, in the direction of the arrow 104, the cam tracks 94 curve inwardly toward space 69 and at the position *b* said cam tracks are at a minimum distance from each other. The projections or blades 95 are thus moved toward each other into the space 96.

It will be noted that when the blades 95 reach the point *b* they will be projected into the space 69. It will also be noted that at the point *b* in the rotation of the rotatable frame 3 the arcuate space 69 ascends at a relatively rapid rate. Consequently, material which is to be elevated will be inhibited from slipping rearwardly in the space 69 by the inward movement of the blades 95. When the blades 95 move inwardly between the points *a* and *b* they penetrate the mass of material being carried upon the belt 60 and function as baffles during the raising of the material. Although the projections 95 are shown as being relatively flat blade-like members, it is to be understood that said projections may take any desired form depending upon the nature of the material being elevated.

From the point *b* to the point *c* the cam tracks 94 are in their innermost position with respect to each other, that is, the projections 95 are in their inwardly disposed position relative to the space 69. When the rotatable frame 3 progresses from *c* to *d* the cam tracks diverge whereby the projections 95 move outwardly away from each other with respect to the space 69. It will be noted that this outwardly moving action of the projections 95 occurs in the vicinity of the terminal roll 62 and that the material being elevated is substantially entirely supported by the tangential portion 71 of the belt 70. If desired, side walls 105 (Fig. 3) may flank the tangential portion of the belt 71 whereby the material will be prevented from spilling from the sides of the belt during the passage of the belt from the rotatable frame 3 over the roll 72. From the point *d*, that is, where the projections are fully retracted from the space 69 to the point *a*, the cam tracks 94 are in their outwardly disposed position and when they reach the point *a* they move inwardly, thereby repeating the cycle.

In Fig. 9, the shaded portion 71' is adapted to indicate the transition shown between the point *d* on the lower rotatable frame 3 to the point *e* on the upper rotatable frame. As has been hereinbefore discussed, when the blades traveling in the cam tracks 94 reach the point *d* they are fully retracted and consequently the material is transported solely by means of the tangential portion 71 of the belt 70 to the transfer plate 87. It will be noted from Fig. 9 that intermediate the travel between point *d* and point *e* the cam tracks 100 associated with the upper rotatable frame 4 curve inwardly toward each other from an outward position. In other words, when the point *i* is reached in the cycle of rotation of the frame 4 the blades 101 commence to move inwardly into the space 86. It can be seen that before the material being conveyed reaches the transfer plate 87 that blades 101 are substantially in their innermost position whereby the material transferred from the belt 70 can be moved over the stationary surface of the transfer plate 87. When the rotatable frame 4 has reached the point *f*, the cam tracks 100 are in their innermost position, that is, the blades 101 will be projected inwardly toward each other to their maximum limit. The material being conveyed is then carried upon the belt 75 and the inwardly projected blades 101 inhibit said material from slipping rearwardly or retrogressing in the space 86.

From the point *f* to the point *g* the cam tracks 100 are disposed in their innermost position and are spaced a constant minimum distance from each other. When the rotatable frame reaches the point *g* the cam tracks 101 on opposite sides of the machine diverge whereby the blades are retracted from the space 86, the retraction being completed at the point *h*. It is at this point that the belt 82 moves away from the rotatable frame 4 in tangential fashion. Thereafter the cam tracks 100 are in their maximum diverged position and consequently the blades 101 are retracted from the point *h* to the point *i* where the cycle recommences.

It will be noted that in the case of both the rotatable frames 3 and 4 the projections or blades are moved into the arcuate spaces 69 and 86 respectively where the material being conveyed is elevated. The blades 101 are retracted from the space 86 whereby the belt 82 may move outwardly from the rotatable frame 4 with the material carried thereon.

Figure 10:
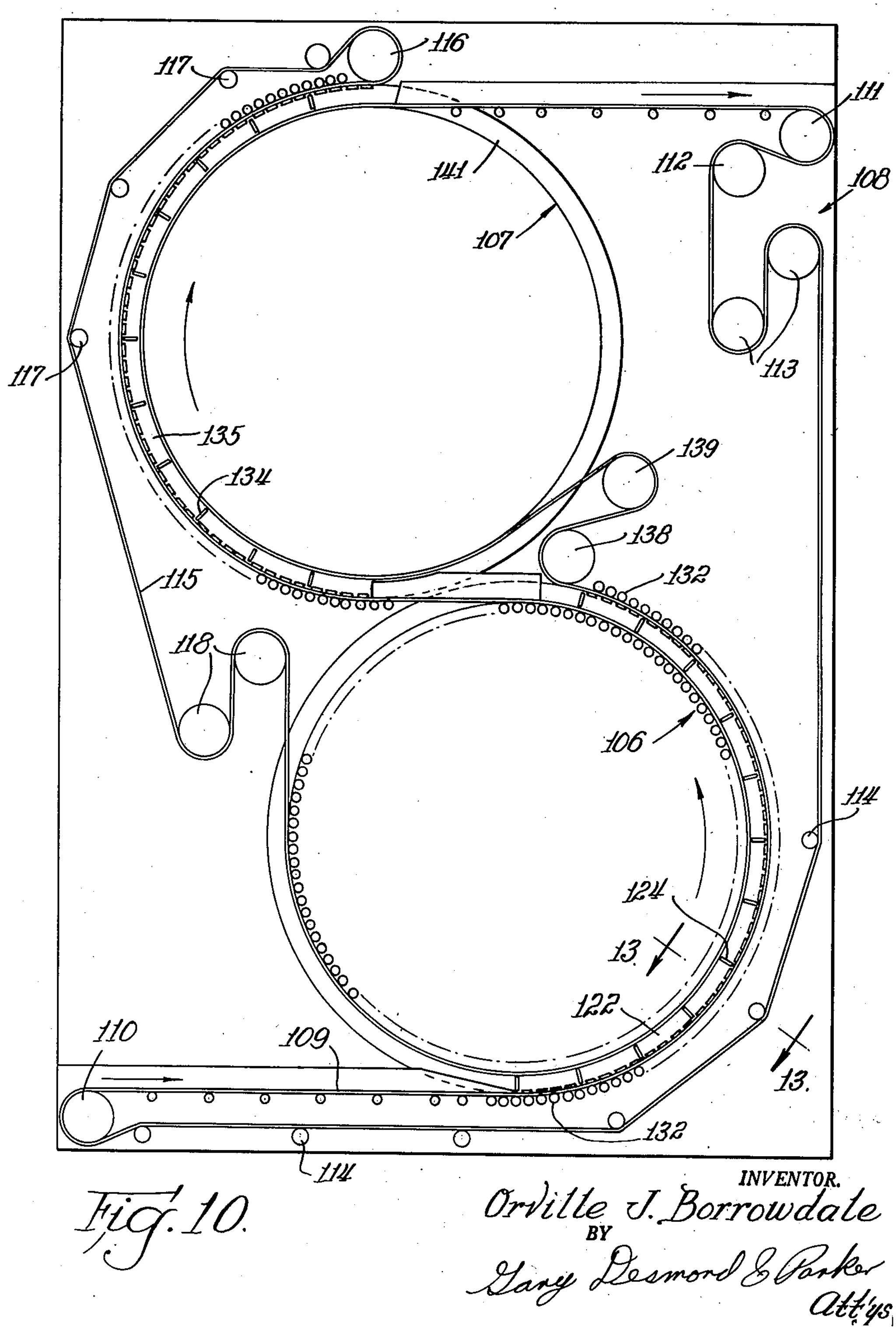
Fig. 10 is a diagrammatic view, similar to Fig. 3, showing a modified belt arrangement wherein two belts are employed for plural elevating stages.

Referring particularly to Fig. 10, a diagrammatic view of a modified form of multiple stage elevator-conveyor is shown wherein but two endless conveyor belts are employed. In this form of the invention it is unnecessary to transfer the material being elevated from one belt to another when the material is moved from a lower stage to an upper stage. The reference numeral 106 indicates a lower rotatable frame and 107 indicates an upper rotatable frame comprising, respectively, the lower and upper elevating stages. Both rotatable frames 106 and 107 are mounted upon stationary frame 108 which is identical with the stationary frame, hereinbefore described. The rotatable frames 106 and 107 are somewhat similar to the rotatable frames 3 and 4, hereinbefore described, with differences which will be described in detail hereinafter.

In general, a primary endless belt 109 is trained around terminal rolls 110 and 111 mounted upon the stationary frame, and between said rolls one pass of said belt wraps around the upwardly moving sides of both rotatable frames 106 and 107. The belt 109, on its return pass, wraps around guide roll 112, belt-tightener rolls 113 and guide rolls 114, all of which are carried on the stationary frame 108. A secondary belt 115 wraps around the lower rotatable frame 106 as a terminal roll and at the opposite end is trained around terminal roll 116. In wrapping around the upwardly moving side of rotatable frame 106, belt 115 is spaced radially inwardly from belt 109 and in passing around the upwardly moving side of frame 107, the belt 115 is spaced radially outwardly from the belt 109. On the return pass from terminal roll 116 the belt 115 is guided by guide rolls 117 and is trained around belt-tightener rolls 118, all of which are mounted upon the stationary frame 108.

In employing but two belts, account must be taken of the relative widths of the belts. For example, it will be noted that belt 109 is spaced radially outwardly from belt 115 upon rotatable frame 106 and upon the rotatable frame 107 the reverse is true. In the form of the invention illustrated in Fig. 3 where separate belts are employed for each stage, the belt 60, in order to be supported in radially spaced relationship to belt 70 is constructed wider than belt 70 so that it can be supported upon the ledges or extensions 65. The same is true with respect to the relationship of belts 75 and 82 of the upper stage. However, where but two belts are employed for both stages, other expedients must be employed since belt 109 is radially outwardly from belt 115 on frame 106 and is radially inwardly from belt 115 on frame 107. To provide for this arrangement, belts 109 and 115 are constructed of the same width and movable shoulder means is employed to provide support for the radially outward belt. The necessity for this expedient accounts primarily for one difference in construction between frames 106 and 107 and frames 3 and 4.

In addition, it will be noted that the belts 109 and 115 in their travel over the arcs of the frames 106 and 107 traverse different distances since, over a predetermined frame, the belts traverse arcs of different radii. It is desirable that the frames 106 and 107 be geared together, as has been hereinbefore described in conjunction with the description of rotatable frames 3 and 4. However, as will be hereinafter described, it is desirable that frame 107 move angularly slightly faster than frame 106. Consequently, a compensation must be made in the travel of one of said belts to provide compensatory movement of one belt relative to the other. The means for compensating for this factor is employed with the lower rotatable frame 106 and in this respect, also, the lower frame 106 differs from frame 3 and also from frame 107.

Figure 13:
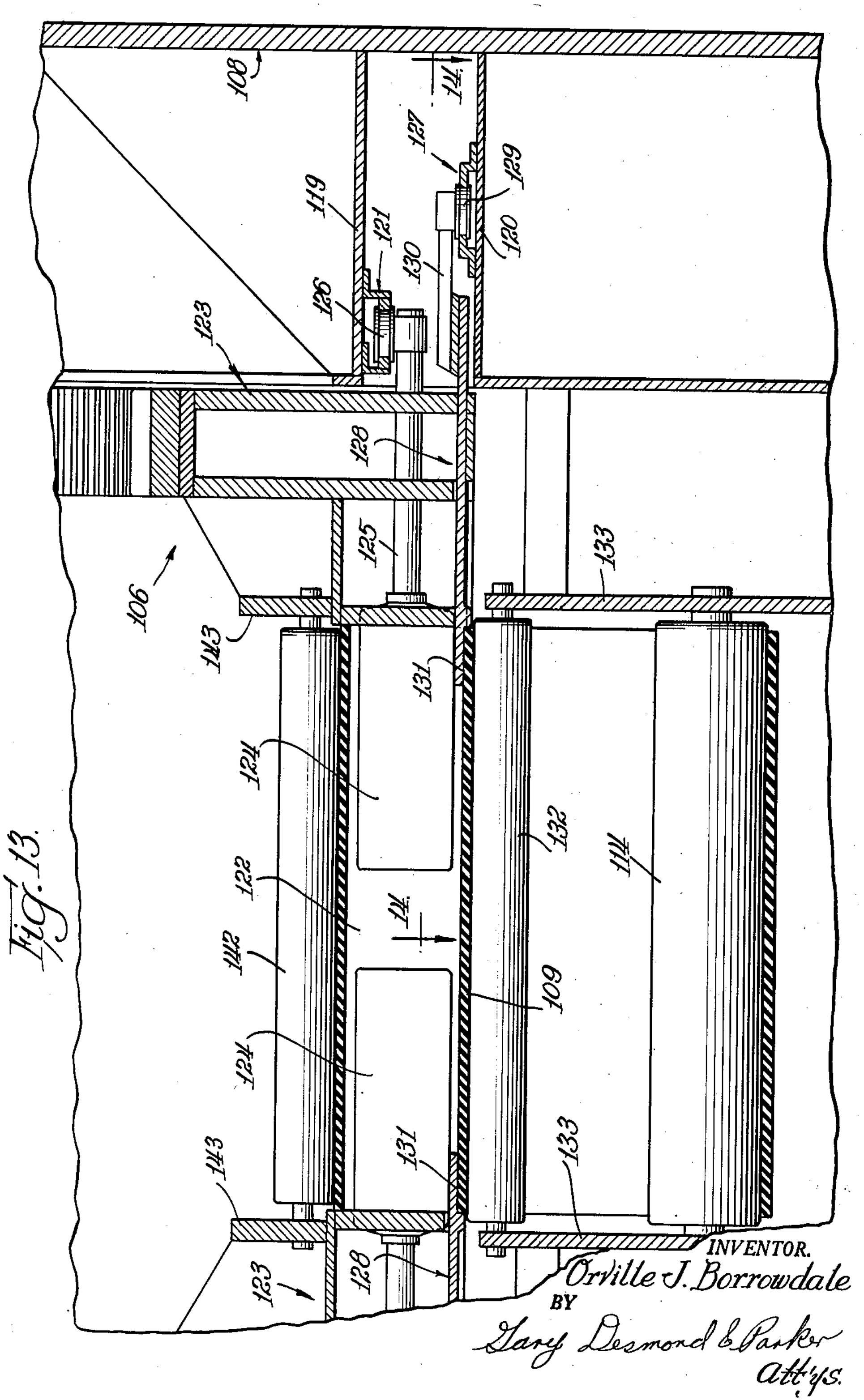
Fig. 13 is an enlarged detailed sectional view taken on line 13—13 of Fig. 10.

Referring particularly to Fig. 13 a pair of spaced annular walls 119 and 120 are carried upon the opposite sides of the stationary frame 108. On the inner face of each of the outer walls 119 an endless cam track 121 is carried. The function of the cam track 121, as will be hereinafter more fully described, is to move projecting members into the arcuate space 122 provided between belts 109 and 115 adjacent the upwardly moving side of the rotatable frame 106. The rotatable frame 106 comprises opposite annular frame members 123 and circumferentially positioned upon the opposite frame members are a plurality of projecting elements or blades 124, said blades being movable into and out of the arcuate space 122. Each of the blades 124 is carried by a rod 125 which, at its end carries a grooved roller 126 which makes engagement with the cam tracks 121.

Figures 11, 12:
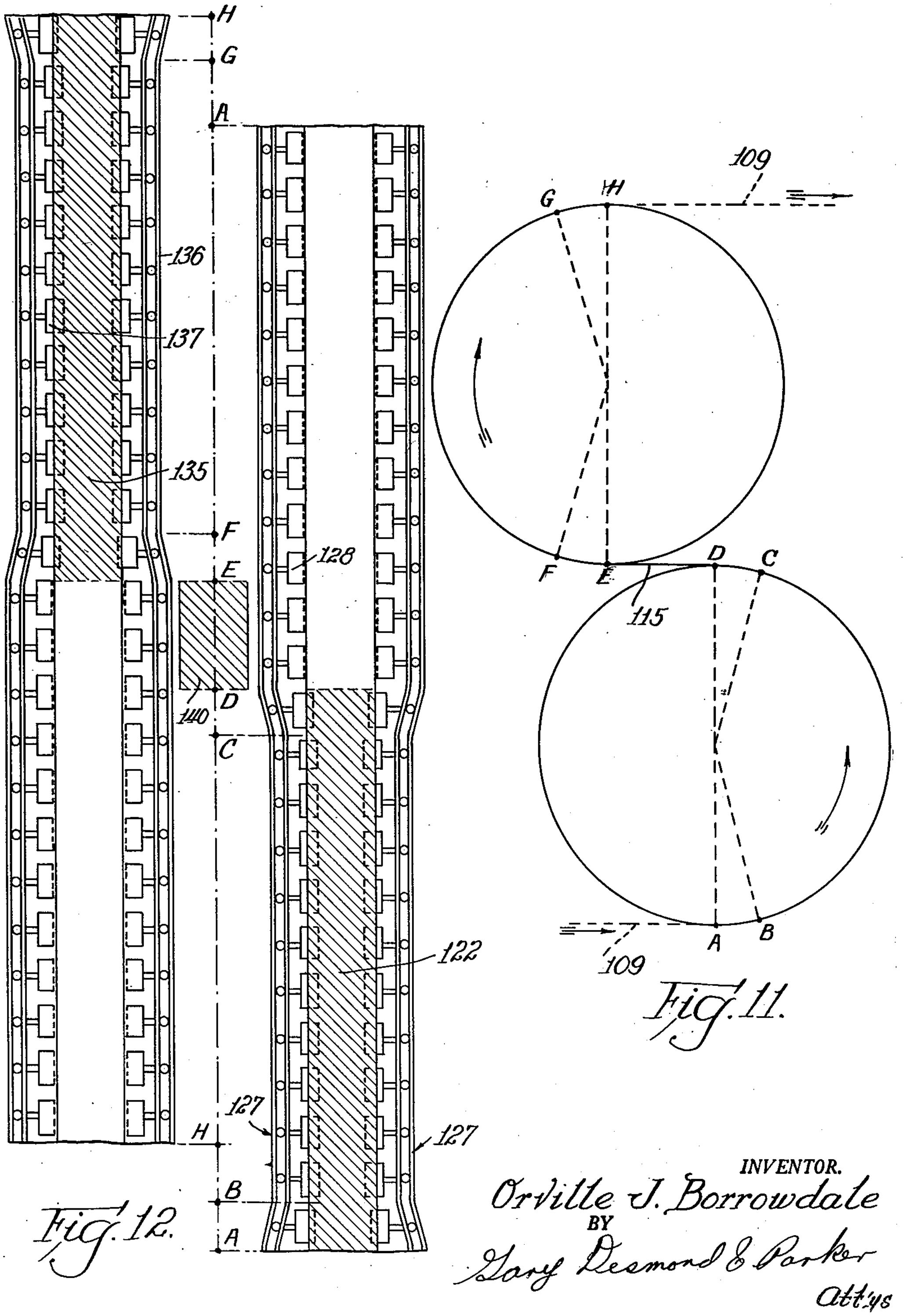
Fig. 11 is a diagrammatic view, similar to Fig. 8, of two stages of a modified form of elevator conveyor wherein two belts are employed having a maximum width.
Fig. 12 is a view similar to Fig. 9, showing the cam tracks for the movable shoulders which permits the use of a belt of maximum width.

On the inner faces of each of the opposite annular walls 120 cam tracks 127 are positioned. The cam tracks 127 are endless and, although laterally spaced from the cam tracks 121, both cam tracks follow parallel paths. In Fig. 12 a development of the cam tracks 127 is shown. It is to be understood that the cam tracks 121 follow the same contour as the cam tracks 127.

A plurality of movable shoulders 128 are slidably positioned in the walls of the annular frame members 123 on each side of the rotatable frame 106. Each of said shoulders is connected to a follower roller 129 by means of a connecting rod 130. The end portions of the shoulders 128 are movable into and out of the space 122 in timed relationship with the inward and outward movement of the projecting members 124 into said space. As will be hereinafter more fully described, the shoulders 128 move into the space 122 at the upwardly moving side of the rotatable frame 106 and the end portions of said shoulders function as opposite supports for the edge portions of belt 109 during its travel over the upwardly moving portion of the rotatable frame 106. Thus, when belt 109 moves upwardly about rotatable frame 106 said belt is supported against inward radial movement by the projecting end portions 131 of the movable shoulders 128 at each side of the rotatable frame.

A plurality of supporting rollers 132 are disposed along the upwardly moving side of the rotatable frame 106. The rollers 132 are supported by frame members 133 which comprise a portion of the stationary frame 108. The rollers 132 are spaced closely together and function to support the belt 109 against outward radial movement thereof during its passage over the upwardly moving side of the frame 106. Thus belt 109 during its movement over the upwardly moving side of the rotatable frame 106 is supported both by the projecting end portions 131 of shoulders 128 and by the circumferentially disposed rollers 132.

The rotatable frame 107 is constructed somewhat similar to the frame 106. Cam tracks are associated with the rotatable frame 107, being supported by the stationary frame 108, said cam tracks functioning to move projecting members or blades 134 inwardly and outwardly with respect to the arcuate space 135 provided between belts 115 and 109 as said belts move over the upwardly moving side of the rotatable frame 107. The arrangement for moving the blades 134 inwardly and outwardly with respect to space 135 is the same as that described in conjunction with the lower rotatable frame 106.

In addition, a pair of endless tracks 136 are carried by the stationary frame 108 adjacent the upper rotatable frame 107. The cam tracks are adapted to move shoulders similar to shoulders 128 inwardly and outwardly with respect to the space 135 during the rotation of the rotatable frame 107. The arrangement being substantially as that hereinbefore described with respect to shoulders 128 and the lower rotatable frame 106. The cam tracks 136 are parallel to and have the same contour as the cam tracks (not shown) corresponding to the cam tracks 121, that is, the cam tracks which move the projections or blades 134 inwardly and outwardly with respect to the space 135.

Referring particularly to Figs. 11 and 12, diagrammatic views are shown which relate the movement of the supporting shoulders for the belts 109 and 115 during their travel respectively over the lower rotatable frame 106 and the upper rotatable frame 107. In Fig. 12 the shoulders 128 are shown diagrammatically at 128′ and the shoulders associated with the upper rotatable frame, that is, the shoulders associated with cam tracks 136 are indicated diagrammatically at 137.

At the point A in Figs. 11 and 12 the cam tracks 127 on each side of the rotatable frame are at their position of maximum spacing from each other. The point A occurs where the upper pass of belt 109 makes substantial tangential contact with the rotatable frame 106. From the point A to the point B the cam tracks 127 move inwardly toward each other whereby the shoulders 128, diagrammatically shown at 128′ move inwardly with respect to the arcuate space 122. When the shoulders 128 are thus moved inwardly they are in a position to support the opposite edge portions of the belt 109. From the point B to point C the shoulders 128 are in their supporting position with respect to the belt 109, that is, said shoulders support the belt 109 during its travel over the upwardly moving side of the rotatable frame 106.

Between point C and point D the cam tracks diverge from each other and hence the shoulders 128 move outwardly with respect to each other. At this point the belt 109 is trained around guide rolls 138 and 139.

At the upwardly moving side of the lower rotatable frame 106 the belt 115 is carried in radial spaced relationship with respect to the belt 109. The means for carrying the belt 115 will be hereinafter more fully described. At substantially the point D the belt 115 moves tangentially with respect to the lower frame 106 and also moves tangentially with respect to the upper rotatable frame 107. In Fig. 12 this zone of travel of belt 115 between the lower rotatable frame 106 and the upper rotatable frame 107 is indicated by the shaded area 140, the belt 115 traveling from D to the point E. When the belt 115 reaches the point E and moves into substantial tangential contact with the upper rotatable frame 107, said belt must be supported in its outer radial position by the shoulders 137. It will be noted from Fig. 12 that between the point E and the point F the radial shoulders 137 move inwardly with respect to the space 135, that is, said shoulders move into supporting relationship with respect to the belt 115 in the same manner as the shoulders 128 supported the belt 109 during movement of the belt 109 over the upwardly moving portion of the lower rotatable frame 106.

From point F to point G the shoulders 137 are in their inward position, that is, said shoulders are in supporting relationship with respect to the belt 115. Between point G and point H the cam tracks 136 move outwardly relative to each other and hence the shoulders 137 are retracted from the space 135. The retraction of the shoulders 137 occurs adjacent the terminal roll 116 whereat the belt 115 returns over the guide rolls 117 to the lower rotatable frame.

In this fashion it can be seen that the belt 109 during movement over the upwardly moving side of the lower rotatable frame 106 is supported in its outward radial position relative to belt 115. It can also be seen that when the point D is reached the belt 115 becomes the outermost belt and it is supported by the shoulders 137 to the point H.

As has been hereinbefore described, the cam tracks 127 for moving shoulders 128 are parallel to the cam tracks 121 which move the projections 124 and hence during the inward and outward movement of the shoulders 128 the projections 124 move inwardly and outwardly. The same condition obtains with respect to the cam tracks which manipulate the projections 134 associated with the upper rotatable frame 107, that is, as the shoulders 137 move inwardly and outwardly, the projections 134 move inwardly and outwardly in step with the movement of the shoulder.

As has been hereinbefore mentioned, the belt 109 when traveling over the lower rotatable frame 106, travels over a longer arcuate path than the belt 115 as it travels over the lower rotatable frame. Further, the belt 115 when it travels over the upper rotatable frame, travels over a longer arcuate path than the belt 109 during its travel over the upper rotatable frame. It is desirable to gear the upper rotatable frame and the lower rotatable frame together whereby they will move at a fixed relationship with respect to each other. However, regardless of what relationship is selected, one of the belts during a portion of its travel will move differentially with respect to the other belt and consequently to permit this differential movement means is contemplated for permitting one belt to creep relative to the other belt.

As has been hereinbefore described in conjunction with the lower and upper rotatable frames 3 and 4, the innermost belt upon each frame moves upon a drum plate 21 or 36. The reference numeral 141 indicates a drum plate similar to the drum plates 31 and 36, the drum plate 141 being associated with the upper rotatable frame 107. It is upon this drum plate that the inner belt 109 is supported during its travel over the upwardly moving side of the rotatable frame 107.

The lower rotatable frame, however, instead of having a drum plate similar to the drum plates 21, 36 and 141 is provided with a plurality of rollers 142 which are supported by frame members 143 constituting a portion of the lower rotatable frame 106. The rollers 142 are disposed in closely spaced relationship and are circularly positioned around the entire periphery of the lower rotatable frame 106. Accordingly, the belt 115, which constitutes the inner belt during its travel over the lower rotatable frame 106 is carried upon the closely spaced rollers 142 and is supported thereby. It can readily be seen that in this fashion the belt 115 is free to creep upon the lower rotatable frame 106 and hence the differential rate of travel of the belts is compensated for.

In the operation of the device illustrated in Fig. 10 the material to be elevated is carried upon the upper pass of the belt 109 where said belt moves tangentially into contact with the rotatable frame 106. When the material reaches the point A the shoulders 128 move into supporting relationship with the belt 109 and the projections or blades 124 move inwardly into the space 122 and thus prevent retrogressive movement of the material in said arcuate space. When the material reaches the point C both the shoulders 128 and the projections 124 are retracted and the material is then supported by the belt 115, the belt 109 moving around rollers 139 and moving into tangential relationship with respect to the upper rotatable frame 107 wherein said belt occupies the innermost position. The material then carried by the belt 115 moves into the space 135, the shoulders 137 having previously moved inwardly into supporting relationship with respect to the belt 115 and the projections 134 having also moved inwardly into the space 135 to inhibit retrogressive movement of the material carried through said arcuate space. At the point H the material is carried essentially by the belt 109 and both shoulders 137 and projections 134 will have been retracted whereby said material may be carried onto the tangential portion of the belt 109 and may be delivered to a desired location.

Figure 14:
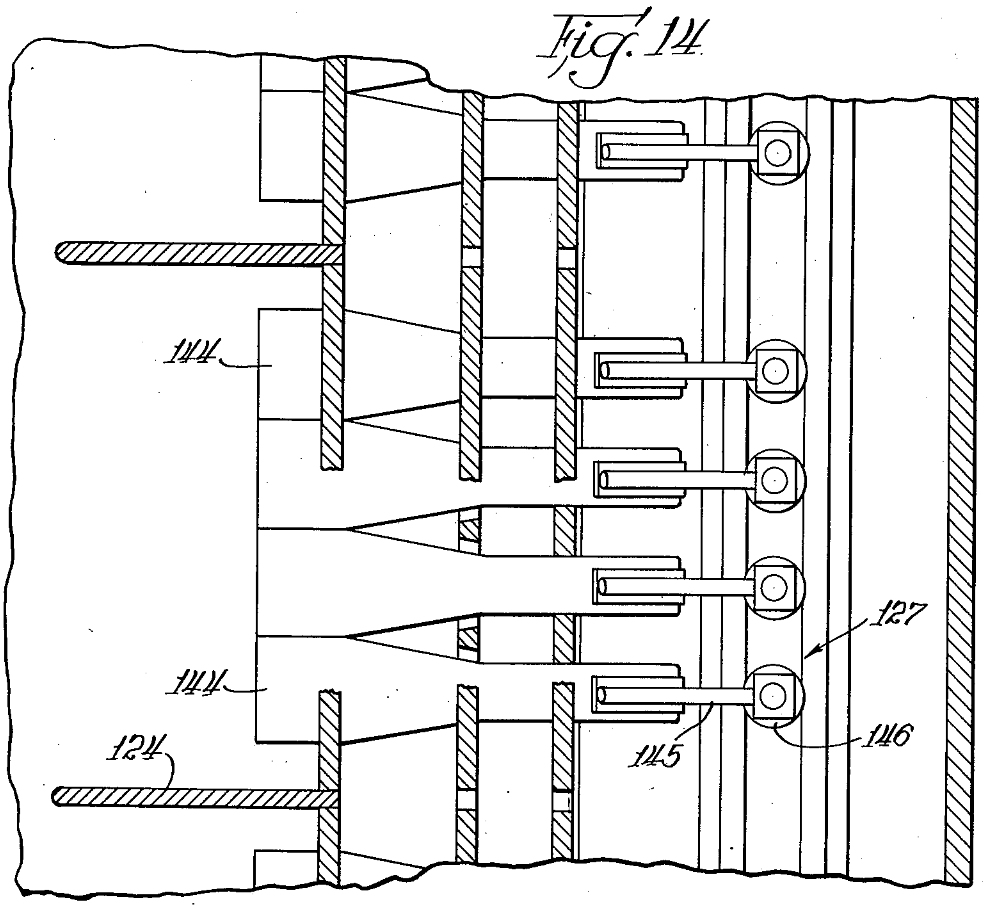
Fig. 14 is a detailed sectional view taken on line 14—14 of Fig. 13.

As shown diagrammatically in Fig. 12, the shoulders 128' and 137 may be relatively wide members. However, it is preferred that said members be relatively narrower than said diagrammatic showing. For instance, with particular reference to Fig. 14, between adjacent projections or blades 124, four shoulders 144 may be employed, each blade being carried by a rod 145 which, at its end, may carry a cam-follower roller 146 which may ride in cam track 127.

Figure 15:
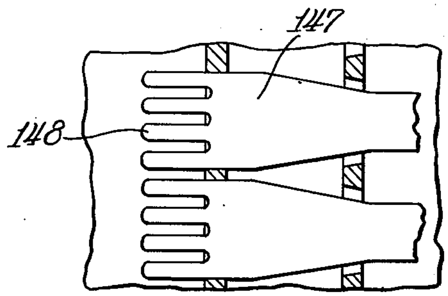
Fig. 15 is a fragmentary detailed view showing a modified form of movable shoulders.

Referring particularly to Fig. 15, a slight modification of the form of shoulders is shown wherein shoulders 147, associated with the device similar to shoulders 144, may have their ends slotted to form fingers 148. By providing the fingers 148 the movement of the shoulders into the arcuate spaces 122 or 135 may be facilitated.

If desired, the rollers 142 instead of being carried upon the rotatable frame 106, may be mounted upon the stationary frame 108, that is, the axes of said rollers may be stationary. In this case the lower rotatable frame 106 may carry only the projecting members or blades 124 and shoulders 131.

I claim as my invention:

1. A multiple stage elevator-conveyor which comprises, a relatively stationary frame, a plurality of substantially circular sectioned relatively rotatable frames mounted upon said stationary frame, said rotatable frames being disposed in substantial tangential superimposed position upon said stationary frame, means carried by said stationary frame for rotating adjacent rotatable frames in opposite directions, means radially spaced outwardly from the periphery of a lower rotatable frame defining an arcuate compartment adjacent said periphery at its upwardly moving side and movable with said rotatable frame for carrying material to be elevated, means radially spaced outwardly from the periphery of the superimposed rotatable frame defining an arcuate compartment adjacent said periphery at its upwardly moving side, said last-mentioned means being movable with said superimposed rotatable frame, means for passing material from the lower arcuate compartment to the upper arcuate compartment to elevate the material in two stages, and means carried by said rotatable frames in circumferentially spaced relationship to each other projecting laterally into said compartments to inhibit retrogressive movement of material in said compartments.

2. A multiple stage elevator-conveyor which comprises, a relatively stationary frame, a plurality of substantially circular sectioned relatively rotatable frames mounted upon said stationary frame, said rotatable frames being disposed in substantial tangential superimposed position upon said stationary frame, means carried by said stationary frame for rotating adjacent rotatable frames in opposite directions, means radially spaced outwardly from the periphery of a lower rotatable frame defining an arcuate compartment adjacent said periphery at its upwardly moving side and movable with said rotatable frame for carrying material to be elevated, means radially spaced outwardly from the periphery of the superimposed rotatable frame defining an arcuate compartment adjacent said periphery at its upwardly moving side, said last-mentioned means being movable with said superimposed rotatable frame, means for passing material from the lower arcuate compartment to the upper arcuate compartment to elevate the material in two stages, projecting means carried by said rotatable frames in circumferentially spaced relationship to each other movable into said compartments to inhibit retrogressive movement of material in said compartments, and means for moving said projecting means laterally into said arcuate compartments.

3. A multiple stage elevator-conveyor which comprises, a relatively stationary frame, a plurality of substantially circular sectioned relatively rotatable frames mounted upon said stationary frame, said rotatable frames being disposed in substantially tangential superimposed position upon said stationary frame, means carried by said stationary frame for rotating adjacent rotatable frames in opposite directions, means radially spaced outwardly from the periphery of a lower rotatable frame defining an arcuate compartment adjacent said periphery at its upwardly moving side and movable with said rotatable frame for carrying material to be elevated, means radially spaced outwardly from the periphery of the superimposed rotatable frame defining an arcuate compartment adjacent said periphery at its upwardly moving side, said last-mentioned means being movable with said superimposed rotatable frame, means for passing material from the lower arcuate compartment to the upper arcuate compartment to elevate the material in two stages, projecting means carried by said rotatable frames in circumferentially spaced relationship to each other movable into said compartments to inhibit retrogressive movement of material in said compartments, an endless cam track carried by said stationary frame adjacent each rotatable frame, cam-follower means carried by said projecting means engageable with said cam tracks for moving said projecting means into said compartments to inhibit retrogressive movement of the material in said compartments.

4. A multiple stage elevator-conveyor which comprises, a relatively stationary frame, a plurality of substantially circular sectioned relatively rotatable frames mounted upon said stationary frame, said rotatable frames being disposed in substantial tangential superimposed position upon said stationary frame, means carried by said stationary frame for rotating adjacent rotatable frames in opposite directions, means radially spaced outwardly from the periphery of a lower rotatable frame defining an arcuate compartment adjacent said periphery at its upwardly moving side and movable with said rotatable frame for carrying material to be elevated, means radially spaced outwardly from the periphery of the superimposed rotatable frame defining an arcuate compartment adjacent said periphery at its upwardly moving side, said last-mentioned means being movable with said superimposed rotatable frame, means for passing material from the lower arcuate compartment to the upper arcuate compartment to elevate the material in two stages, relatively flat blades carried by said rotatable frames in circumferential relationship to each other movable into said compartments to inhibit retrogressive movement of material in said compartments, and means for moving said blades laterally into said arcuate compartments.

5. A multiple stage elevator-conveyor which comprises, a relatively stationary frame, a plurality of substantially circular sectioned relatively rotatable frames mounted upon said stationary frame, said rotatable frames being disposed in substantial tangential superimposed position upon said stationary frame, means carried by said stationary frame for rotating adjacent rotatable frames in opposite directions, means radially spaced outwardly from the periphery of a lower rotatable frame defining an arcuate compartment adjacent said periphery at its upwardly moving side and movable with said rotatable frame for carrying material to be elevated, means radially spaced outwardly from the periphery of the superimposed rotatable frame defining an arcuate compartment adjacent said periphery at its upwardly moving side, said last-mentioned means being movable with said superimposed rotatable frame, means for passing material from the lower arcuate compartment to the upper arcuate compartment to elevate the material in two stages, relatively flat blades carried by said rotatable frames in circumferential relationship to each other movable into said compartments to inhibit retrogressive movement of material in said compartments, and means carried by said stationary frame and said rotatable frames for moving said blades laterally into said arcuate compartments.

6. A multiple stage elevator-conveyor which comprises, a relatively stationary frame, a plurality of substantially circular sectioned relatively rotatable frames mounted upon said stationary frame, said rotatable frames being disposed in substantial tangential superimposed position upon said stationary frame, means carried by said stationary frame for rotating adjacent rotatable frames in opposite directions, an endless belt radially spaced outwardly from the upwardly moving side of said lower movable frame and movable therewith defining with said lower rotatable frame an arcuate compartment for carrying material to be elevated, a second endless belt radially spaced outwardly from the upwardly moving side of the superimposed rotatable frame and movable therewith defining with said superimposed frame an arcuate compartment, means for passing material from the lower arcuate compartment to the upper arcuate compartment to elevate the material in two stages, and means carried by said rotatable frames in circumferentially spaced relationship to each other for lateral movement into said compartments to inhibit retrogressive movement of material in said compartments.

7. A multiple stage elevator-conveyor which comprises, a relatively stationary frame, a plurality of substantially circular sectional relatively rotatable frames mounted upon said stationary frame, said rotatable frames being disposed in substantial tangential superimposed position upon said stationary frame, means carried by said stationary frame for rotating adjacent rotatable frames in opposite directions, an endless belt radially spaced outwardly from the upwardly moving side of said lower movable frame and movable therewith defining with said lower rotatable frame an arcuate compartment for carrying material to be elevated, a second endless belt radially spaced outwardly from the upwardly moving side of the superimposed rotatable frame and movable therewith defining with said superimposed frame an arcuate compartment, means for passing material from the lower arcuate compartment to the upper arcuate compartment to elevate the material in two stages, projecting means carried by said rotatable frames in circumferentially spaced relationship to each other movable into said compartments to inhibit retrogressive movement of material in said compartments, and means for moving said projecting means laterally into said arcuate compartments.

8. A multiple stage elevator-conveyor which comprises, a relatively stationary frame, a plurality of substantially circular sectional relatively rotatable frames mounted upon said stationary frame, said rotatable frames being disposed in substantial tangential superimposed position upon said stationary frame, means carried by said stationary frame for rotating adjacent rotatable frames in opposite directions, an endless belt radially spaced outwardly from the upwardly moving side of said lower movable frame and movable therewith defining with said lower rotatable frame an arcuate compartment for carrying material to be elevated, a second endless belt radially spaced outwardly from the upwardly moving side of the superimposed rotatable frame and movable therewith defining with said superimposed frame an arcuate compartment, means for passing material from the lower arcuate compartment to the upper arcuate compartment to elevate the material in two stages, projecting means carried by said rotatable frames in circumferentially spaced relationship to each other movable into said compartments to inhibit retrogressive movement of material in said compartments, an endless cam track carried by said stationary frame adjacent each rotatable frame, cam-follower means carried by said projecting means engageable with said cam tracks for moving said projecting means into said compartments between said endless belts and the respective rotatable frame peripheries to inhibit retrogressive movement of the material in said compartments.

9. A multiple stage elevator-conveyor which comprises, a relatively stationary frame, a plurality of substantially circular sectioned relatively rotatable frames mounted upon said stationary frame, said rotatable frames being disposed in substantial tangential superimposed position upon said stationary frame, means carried by said stationary frame for rotating adjacent rotatable frames in opposite directions, means defining an arcuate compartment adjacent the periphery of a lower rotatable frame at its upwardly moving side and movable with said rotatable frame for carrying material to be elevated, said means comprising a pair of endless belts, means defining an arcuate compartment adjacent the periphery of the superimposed rotatable frame at its upwardly moving side, said last-mentioned means being movable with said superimposed rotatable frame and comprising a second pair of endless belts, means for passing material from the lower arcuate compartment to the upper arcuate compartment to elevate the material in two stages, and means carried by said rotatable frames in circumferentially spaced relationship to each other for lateral movement into said compartments to inhibit retrogressive movement of material in said compartments.

10. A multiple stage elevator-conveyor which comprises, a relatively stationary frame, a plurality of substantially circular sectioned relatively rotatable frames mounted upon said stationary frame, said rotatable frames being disposed in substantial tangential superimposed position upon said stationary frame, means carried by said stationary frame for rotating adjacent rotatable frames in opposite directions, means defining an arcuate compartment adjacent the periphery of a lower rotatable frame at its upwardly moving side and movable with said rotatable frame for carrying material to be elevated, said means comprising a pair of endless belts radially spaced from each other on the upwardly moving side of said rotatable frame, means defining an arcuate compartment adjacent the periphery of the superimposed rotatable frame at its upwardly moving side, said last-mentioned means being movable with said superimposed rotatable frame and comprising a second pair of endless belts radially spaced from each other on the upwardly moving side of said rotatable frame, means for passing material from the lower arcuate compartment to the upper arcuate compartment to elevate the material in two stages, and means carried by said rotatable frames in circumferentially spaced relationship to each other for lateral movement into said compartments to inhibit retrogressive movement of material in said compartments.

11. A multiple stage elevator-conveyor which comprises, a relatively stationary frame, a plurality of substantially circular sectioned relatively rotatable frames mounted upon said stationary frame, said rotatable frames being disposed in substantial tangential superimposed position upon said stationary frame, means carried by said stationary frame for rotating adjacent rotatable frames in opposite directions, a primary endless belt trained around the upwardly moving side of said lower rotatable frame, a secondary endless belt carried upon said upwardly moving side of said lower rotatable frame, said primary belt being in radially outwardly spaced relationship to said secondary belt to define an arcuate compartment for material to be elevated, said secondary belt and primary belts being carried upon the superimposed rotatable frame in radial spaced relationship to define an arcuate compartment upon the upwardly moving side of said superimposed rotatable frame, said compartments being substantially connected together at the zone of tangency of said rotatable frames whereby material being elevated is passed from the lower arcuate compartment to the upper arcuate compartment, and means carried by said rotatable frames in circumferentially spaced relationship to each other for projecting laterally into said compartments to inhibit retrogressive movement of material in said compartments.

12. A multiple stage elevator-conveyor which comprises, a relatively stationary frame, a plurality of substantially circular sectioned relatively rotatable frames mounted upon said stationary frame, said rotatable frames being disposed in substantial tangential superimposed position relative to each other upon said stationary frame, means carried by said stationary frame for rotating adjacent rotatable frames in opposite directions, a primary endless belt and a secondary endless belt carried upon said upwardly moving side of said lower rotatable frame, said primary belt being disposed in radially outwardly spaced relationship relative to said secondary belt to define an arcuate compartment for material to be elevated, said secondary belt and primary belts being carried upon the superimposed rotatable frame, said secondary belt being disposed in radially outwardly spaced relationship to said primary belt to define an arcuate compartment upon the upwardly moving side of said superimposed rotatable frame, said compartments being substantially connected together at the zone of tangency of said rotatable frames whereby material being elevated is passed from the lower arcuate compartment to the upper arcuate compartment, and means carried by said rotatable frames in circumferentially spaced relationship to each other for lateral movement into said compartments to inhibit retrogressive movement of material in said compartments.

13. A multiple stage elevator-conveyor which comprises, a relatively stationary frame, a plurality of substantially circular sectioned relatively rotatable frames mounted upon said stationary frame, said rotatable frames being disposed in substantial tangential superimposed position upon said stationary frame, means carried by said stationary frame for rotating adjacent rotatable frames in opposite directions, a primary endless belt trained around the upwardly moving side of said lower rotatable frame, a secondary endless belt carried upon said upwardly moving side of said lower rotatable frame, said primary belt being in radially outwardly spaced relationship to said secondary belt to define an arcuate compartment for material to be elevated, said secondary belt and primary belts being carried upon the superimposed rotatable frame in radial spaced relationship to define an arcuate compartment upon the upwardly moving side of said superimposed rotatable frame, said compartments being substantially connected together at the zone of tangency of said rotatable frames whereby material being elevated is passed from the lower arcuate compartment to the upper arcuate compartment, and blades carried by said rotatable frames in circumferentially spaced relationship to each other for projecting laterally into said compartments to inhibit retrogressive movement of material in said compartments.

14. A multiple stage elevator-conveyor which comprises, a relatively stationary frame, a plurality of substantially circular sectioned relatively rotatable frames mounted upon said stationary frame, said rotatable frames being disposed in substantial tangential superimposed position upon said stationary frame, means carried by said stationary frame for rotating adjacent rotatable frames in opposite directions, a primary endless belt trained around the upwardly moving side of said lower rotatable frame, a secondary endless belt carried upon said upwardly moving side of said rotatable frame, said primary belt being in radially outwardly spaced relationship to said secondary belt to define an arcuate compartment for material to be elevated, said secondary belt and primary belts being carried upon the superimposed rotatable frame in radial spaced relationship to define an arcuate compartment upon the upwardly moving side of said superimposed rotatable frame, said compartments being substantially connected together at the zone of tangency of said rotatable frames whereby material being elevated is passed from the lower arcuate compartment to the upper arcuate compartment, means carried by said rotatable frames in circumferentially spaced relationship to each other for lateral movement into said compartments to inhibit retrogressive movement of material in said compartments, and means carried by said stationary frame and said rotatable frames for laterally moving said projecting means into and out of said compartments.

15. A multiple stage elevator-conveyor which comprises, a relatively stationary frame, a plurality of substantially circular sectioned relatively rotatable frames mounted upon said stationary frame, said rotatable frames being disposed in substantial tangential superimposed position upon said stationary frame, means carried by said stationary frame for rotating adjacent rotatable frames in opposite directions, a secondary endless belt trained around the upwardly moving side of said lower rotatable frame, a primary endless belt, means carried by said lower rotatable frame for supporting said primary belt in radially outwardly spaced relationship to said secondary belt to define an arcuate compartment for material to be elevated, said primary belt being trained around the upwardly moving side of said superimposed rotatable frame, means carried by said superimposed rotatable frame for supporting said secondary belt in radially outwardly spaced relationship to said primary belt to define an arcuate compartment upon the upwardly moving side of said superimposed rotatable frame, said compartments being substantially connected together at the zone of tangency of said rotatable frames whereby material being elevated is passed from the lower arcuate compartment to the upper arcuate compartment, means carried by said rotatable frames in circumferentially spaced relationship to each other for lateral movement into said compartments to inhibit retrogressive movement of the material in said compartments.

16. A multiple stage elevator-conveyor which comprises, a relatively stationary frame, a plurality of substantially circular sectioned relatively rotatable frames mounted upon said stationary frame, said rotatable frames being disposed in substantial tangential superimposed position upon said stationary frame, means carried by said stationary frame for rotating adjacent rotatable frames in opposite directions, a secondary endless belt trained around the upwardly moving side of said lower rotatable frame, a primary endless belt, laterally movable means carried by said lower rotatable frame for supporting said primary belt in radially outwardly spaced relationship to said secondary belt to define an arcuate compartment for material to be elevated, said primary belt being trained around the upwardly moving side of said superimposed rotatable frame, laterally movable means carried by said superimposed rotatable frame for supporting said secondary belt in radially outwardly spaced relationship to said primary belt to define an arcuate compartment upon the upwardly moving side of said superimposed rotatable frame, said compartments being substantially connected together at the zone of tangency of said rotatable frames whereby material being elevated is passed from the lower arcuate compartment to the upper arcuate compartment, means carried by said rotatable frames in circumferentially spaced relationship to each other for projecting into said compartments to inhibit retrogressive movement of the material in said compartments.

17. A multiple stage elevator-conveyor which comprises, a relatively stationary frame, a plurality of substantially circular sectioned relatively rotatable frames mounted upon said stationary frame, said rotatable frames being disposed in substantial tangential superimposed position upon said stationary frame, means carried by said stationary frame for rotating adjacent rotatable frames in opposite directions, a secondary endless belt trained around the upwardly moving side of said lower rotatable frame, a primary endless belt, means carried by said lower rotatable frame for supporting said primary belt in radially outwardly spaced relationship to said secondary belt to define an arcuate compartment for material to be elevated, means carried by said stationary frame and said rotatable frame for moving said supporting means into supporting position for said radially outwardly spaced belt, said primary belt being trained around the upwardly moving side of said superimposed rotatable frame, separate means carried by said superimposed rotatable frame for supporting said secondary belt in radially outwardly spaced relationship to said primary belt to define an arcuate compartment upon the upwardly moving side of said superimposed rotatable frame, means carried by said stationary frame and said rotatable frame for moving said separate supporting means into supporting position for said radially outwardly spaced belt, said compartments being substantially connected together at the zone of tangency of said rotatable frames whereby material being elevated is passed from the lower arcuate compartment to the upper arcuate compartment, means carried by said rotatable frames in circumferentially spaced relationship to each other for projecting into said compartments to inhibit retrogressive movement of the material in said compartments.

18. A multiple stage elevator-conveyor which comprises, a relatively stationary frame, a plurality of substantially circular sectioned relatively rotatable frames mounted upon said stationary frame, said rotatable frames being disposed in substantial tangential superimposed position upon said stationary frame, means carried by said stationary frame for rotating adjacent rotatable frames in opposite directions, a secondary endless belt trained around the upwardly moving side of said lower rotatable frame, a primary endless belt of substantially the same width as said secondary belt, means carried by said lower rotatable frame for supporting said primary belt in radially outwardly spaced relationship to said secondary belt to define an arcuate compartment for material to be elevated, said primary belt being trained around the upwardly moving side of said superimposed rotatable frame, means carried by said superimposed rotatable frame for supporting said secondary belt in radially outwardly spaced relationship to said primary belt to define an arcuate compartment upon the upwardly moving side of said superimposed rotatable frame, said compartments being substantially connected together at the zone of tangency of said rotatable frames whereby material being elevated is passed from the lower arcuate compartment to the upper arcuate compartment, means carried by said rotatable frames in circumferentially spaced relationship to each other for projecting into said compartments to inhibit retrogressive movement of the material in said compartments.

References Cited in the file of this patent

UNITED STATES PATENTS

| | | |
|---|---|---|
| 1,776,420 | Eichenberger | Sept. 23, 1930 |
| 1,919,275 | Dunham | July 25, 1933 |

FOREIGN PATENTS

| | | |
|---|---|---|
| 415,776 | Germany | June 30, 1925 |